United States Patent
Mohamad et al.

(10) Patent No.: US 11,788,772 B2
(45) Date of Patent: Oct. 17, 2023

(54) THERMAL RADIATION LOSS REDUCTION IN A PARABOLIC TROUGH RECEIVER BY THE APPLICATION OF A CAVITY MIRROR AND A HOT MIRROR COATING

(71) Applicant: University of the Witwatersrand, Johannesburg, Johannesburg (ZA)

(72) Inventors: Khaled Mohamad, Johannesburg (ZA); Phillipe Ferrer, Johannesburg (ZA)

(73) Assignee: UNIVERSITY OF THE WITWATERSRAND, JOHANNESBURG, Johannesburg (ZA)

( * ) Notice: Subject to any disclaimer, the term of this patent is extended or adjusted under 35 U.S.C. 154(b) by 0 days.

(21) Appl. No.: 17/051,888

(22) PCT Filed: Apr. 30, 2019

(86) PCT No.: PCT/IB2019/053531
§ 371 (c)(1),
(2) Date: Oct. 30, 2020

(87) PCT Pub. No.: WO2019/211746
PCT Pub. Date: Nov. 7, 2019

(65) Prior Publication Data
US 2021/0190382 A1   Jun. 24, 2021

(30) Foreign Application Priority Data
Apr. 30, 2018  (ZA) .................... 2018/02827

(51) Int. Cl.
*F24S 10/40*   (2018.01)
*F24S 20/20*   (2018.01)
*F24S 80/56*   (2018.01)

(52) U.S. Cl.
CPC ............... *F24S 10/45* (2018.05); *F24S 20/20* (2018.05); *F24S 80/56* (2018.05)

(58) Field of Classification Search
CPC ............ F24S 10/45; F24S 20/20; F24S 80/56
See application file for complete search history.

(56) References Cited

U.S. PATENT DOCUMENTS

| 3,987,781 A | 10/1976 | Nozik et al. |
| 4,512,335 A | 4/1985 | Mori |

(Continued)

FOREIGN PATENT DOCUMENTS

| CN | 103196242 A | * | 7/2013 |
| CN | 103196242 A | | 7/2013 |

(Continued)

OTHER PUBLICATIONS

English Translation CN103225900 A (Year: 2013).*

(Continued)

*Primary Examiner* — Shafiq Mian
(74) *Attorney, Agent, or Firm* — Meunier Carlin & Curfman LLC (57) ABSTRACT

This invention concerns a receiver unit (10) for a parabolic trough solar plant. The receiver unit (10) has a conduit (12) for conveying a heat transfer fluid (14) and a cover (16), which is located about the conduit (12) such that a vacuum is formed between the conduit and the cover. The conduit (12) is designed to absorb thermal radiation. The cover (16) has a first portion (26) defining a window (22) through which incoming solar radiation (24) passes into the vacuum and onto the conduit (12) and a second portion (28) carrying a reflective surface (20) so as to reflect thermal radiation back onto the conduit (12). The invention also concerns a method of reducing thermal radiation loss from a parabolic trough receiver.

4 Claims, 10 Drawing Sheets

(56) References Cited

U.S. PATENT DOCUMENTS

| | | | |
|---|---|---|---|
| 2007/0209658 A1* | 9/2007 | Riffelmann | F24S 10/45 |
| | | | 126/684 |
| 2007/0227579 A1* | 10/2007 | Buller | H01L 31/035281 |
| | | | 257/E27.125 |
| 2008/0216822 A1* | 9/2008 | Lazzara | F01K 3/00 |
| | | | 126/617 |
| 2010/0218496 A1* | 9/2010 | Miles | F28D 20/00 |
| | | | 60/519 |
| 2011/0220096 A1* | 9/2011 | Margankunte | F24S 23/745 |
| | | | 126/684 |
| 2012/0000530 A1* | 1/2012 | Miles | F24S 80/65 |
| | | | 165/104.19 |
| 2013/0014746 A1* | 1/2013 | Simonetti | F24S 20/20 |
| | | | 126/651 |
| 2013/0192226 A1* | 8/2013 | Stettenheim | F24S 23/74 |
| | | | 60/641.15 |
| 2013/0269683 A1* | 10/2013 | Nunez | F24S 10/70 |
| | | | 126/714 |
| 2015/0033740 A1* | 2/2015 | Anderson | F28D 20/00 |
| | | | 60/641.15 |
| 2015/0090250 A1* | 4/2015 | Im | F24S 80/56 |
| | | | 126/684 |
| 2015/0184894 A1* | 7/2015 | Verma | F03G 6/067 |
| | | | 126/620 |

FOREIGN PATENT DOCUMENTS

| | | | |
|---|---|---|---|
| CN | 103225900 A | * | 7/2013 |
| CN | 103225900 A | | 7/2013 |
| JP | 2010203624 A | | 9/2010 |
| WO | 2011/121574 A2 | | 10/2011 |
| WO | 2015/047456 A1 | | 4/2015 |

OTHER PUBLICATIONS

English Translation CN 103196242 A (Year: 2013).*

Kaluba V S and Ferrer P; A "model for hot mirror coating on solar parabolic trough receivers," J. Renewable Sustainable Energy, 2016, 8, 053703 (17 pages).

Hachicha A A, Rodriguez I, Capdevila R and Oliva A; "Heat transfer analysis and numerical simulation of a parabolic trough solar collector," Applied Energy, 2013, 111, pp. 581-592.

International Search Report and Written Opinion dated Aug. 13, 2019, from International Application No. PCT/IB2019/053531, 13 pages.

* cited by examiner

THERMAL RADIATION LOSS REDUCTION IN A PARABOLIC TROUGH RECEIVER BY THE APPLICATION OF A CAVITY MIRROR AND A HOT MIRROR COATING

BACKGROUND TO THE INVENTION

THIS invention relates to a method of reducing thermal radiation loss from a parabolic trough receiver. In particular, but not exclusively, the invention relates to a method of reducing thermal radiation loss from a parabolic trough receiver by the application of a cavity mirror and a hot mirror coating. The invention further relates to a receiver unit including a cavity mirror and a hot mirror coating.

Parabolic trough mirror plants are well known in the industry and are typically used to convert solar energy to heat, which can be used either directly in industrial processes, or for electricity generation. In a typical parabolic through mirror design solar radiation is focused onto a linear focal line aimed at a receiver unit. The receiver unit heats up and, in turn, imparts a large portion of its heat to a heat transfer fluid (HTF) circulating within the receiver unit. In a typical design the receiver unit comprises a blackened absorber pipe (AP) that is encapsulated by a glass cover (GC). A vacuum is formed between the absorber pipe and the glass cover in order to minimize convective losses. The thermal contacts between the receiver pipe and the glass cover are further kept to a minimum for the sake of reducing conduction losses. In use, the heat transfer fluid (HTF) inside the absorber pipe is heated by the concentrated solar radiation. The hot heat transfer fluid can then be used in generating electricity through a steam cycle or in thermochemical applications. In this known design the receiver unit is one of the most complex components of the parabolic trough plan and the efficiency of the system as a whole largely depends on it. A significant drawback of this know design is that it has to be designed carefully and in such a way so as to minimize the energy losses.

The efficiency of the parabolic solar trough collector largely depends on the thermal properties of the solar radiation receiver. It is known that thermal heat losses start to dominate at high receiver temperatures and the dominant heat losses occurring at high temperatures are due to the thermal emission (IR) from the receiver unit. A known method to minimize the thermal emission is to paint the receiver unit with a spectrally selective coating, in particular a dielectric film that absorbs well in the visible region of the solar spectrum and emits poorly in the thermal emission region (IR). Many different forms of the selective coating and its properties have been known in the industry. Having said that, this coating typically decomposes thermally around 500° C., reducing the temperature ceiling and, accordingly, the thermal efficiency.

In an attempt to address the heat losses it has also been proposed to use blackbody chambers. However, these known methods to decrease the heat losses are far from ideal as significant heat loss still occur.

It is accordingly an object of the invention to provide a method of reducing thermal radiation loss from a parabolic trough receiver and to provide a parabolic trough receiver that will, at least partially, alleviate the above disadvantages.

It is also an object of the invention to provide a method of reducing thermal radiation loss from a parabolic trough receiver which will be a useful alternative to existing methods. It is yet another object of the invention to provide a parabolic trough receiver which will be a useful alternative to existing receivers.

It is yet further an object of the invention to provide a receiver unit for a parabolic trough receiver that will, at least partially, alleviate the above disadvantages and/or that will be a useful alternative to existing receiver units.

SUMMARY OF THE INVENTION

In accordance with the invention there is provided a receiver unit for a parabolic trough solar plant, the receiver unit including:

a conduit for conveying a heat transfer fluid, the conduit being designed to absorb thermal radiation; and a cover, which is located about the conduit such that a vacuum is formed between the conduit and the cover;

wherein the cover has a first portion, defining a window through which incoming solar radiation passes into the vacuum and onto the conduit, and a second portion carrying a reflective surface so as to reflect thermal radiation back onto the conduit.

The window preferably carries a hot mirror coating for reflecting thermal radiation back onto the conduit.

The hot mirror coating may be applied an internal surface of the window.

In one embodiment the first and second portions of the cover are defined by a tubular glass cover, and the reflective surface carried by the second portion is applied to the glass cover in the region of the second portion.

The reflective surface of the second portion may be in the form of a highly infrared radiation (IR) reflective surface, such as an aluminium surface, for example.

In another embodiment of the invention the window in the first region of the cover is in the form of an opening in the cover, and wherein a glass window to which the hot mirror coating is applied is carried in the opening.

The cover may be in the form of a tubular cover made from a material other than glass. For example, the cover may be in the form of a metal tube such that the reflective surface in the second region is defined by the internal surface of the metal tube.

The cover may be in the form of an aluminium tube.

In accordance with a second aspect of the invention there is provided a method of reducing thermal radiation loss from a parabolic trough receiver having a conduit for conveying a heat transfer fluid, the conduit being designed to absorb thermal radiation, and a cover, which is located about the conduit such that a vacuum is formed between the conduit and the cover, the method including:

allowing incoming solar radiation to pass through a window in the cover, into the vacuum and onto the conduit; and reflecting thermal radiation back onto the conduit from the cover by means of a reflective surface of a second portion of the cover.

The method may include applying a hot mirror coating to the window to reflect thermal radiation back onto the conduit.

BRIEF DESCRIPTION OF THE DRAWINGS

The invention will now be described in more detail, by way of example only, with reference to the accompanying drawings in which.

The graphs of FIGS. 5 to 14 obtained from the simulation apply to a particular example embodiment of the receiver unit in accordance with the invention. In particular, the graphs were obtained using the design parameters set out in Table 1 as discussed below.

DESCRIPTION OF THE ILLUSTRATED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made. The terminology includes the words specifically mentioned above, derivatives thereof, and words or similar import. It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Referring to the drawings, in which like numerals indicate like features, a non-limiting example of a received unit for a parabolic trough solar collector in accordance with the invention is generally indicated by reference numeral 10.

Figure 1:
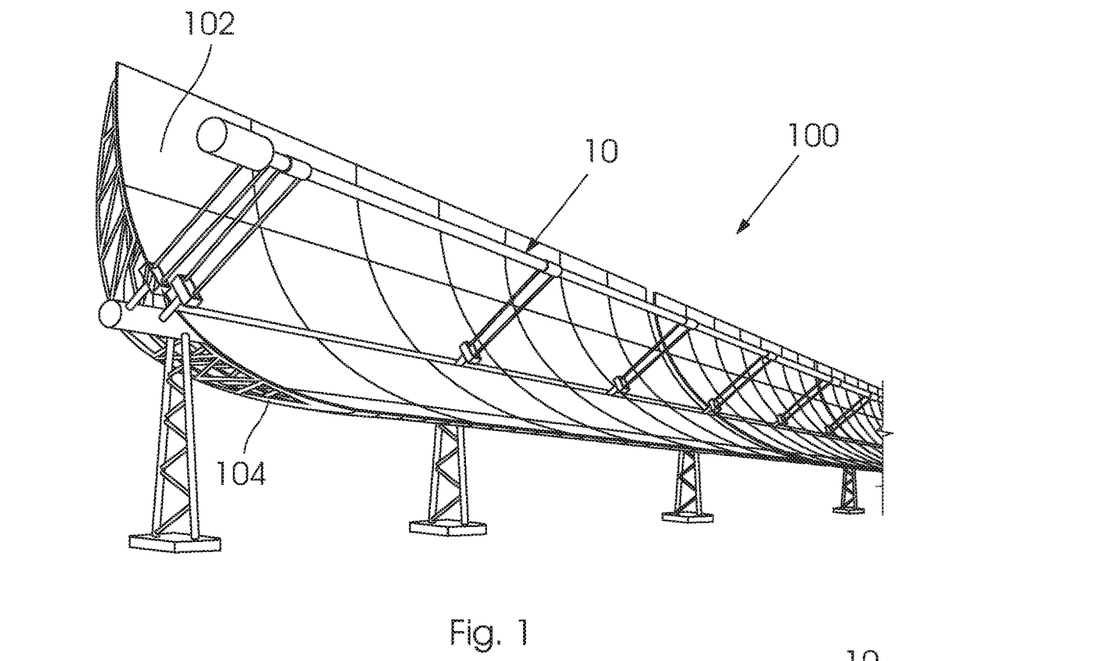
FIG. 1 shows a perspective view of a receiver unit in accordance with the invention forming part of a parabolic trough solar plant, in use.

FIG. 1 shows a perspective view of a parabolic trough collector 100 forming part of a solar plant. The collector 100 has a curved mirror 102 carried by a movable frame 104. The receiver unit 10, which is also referred to as a heat collector element, is installed at the focus point of the curved mirror 102 for optimal absorption of the solar radiation by the receiver unit 10.

Figure 2:
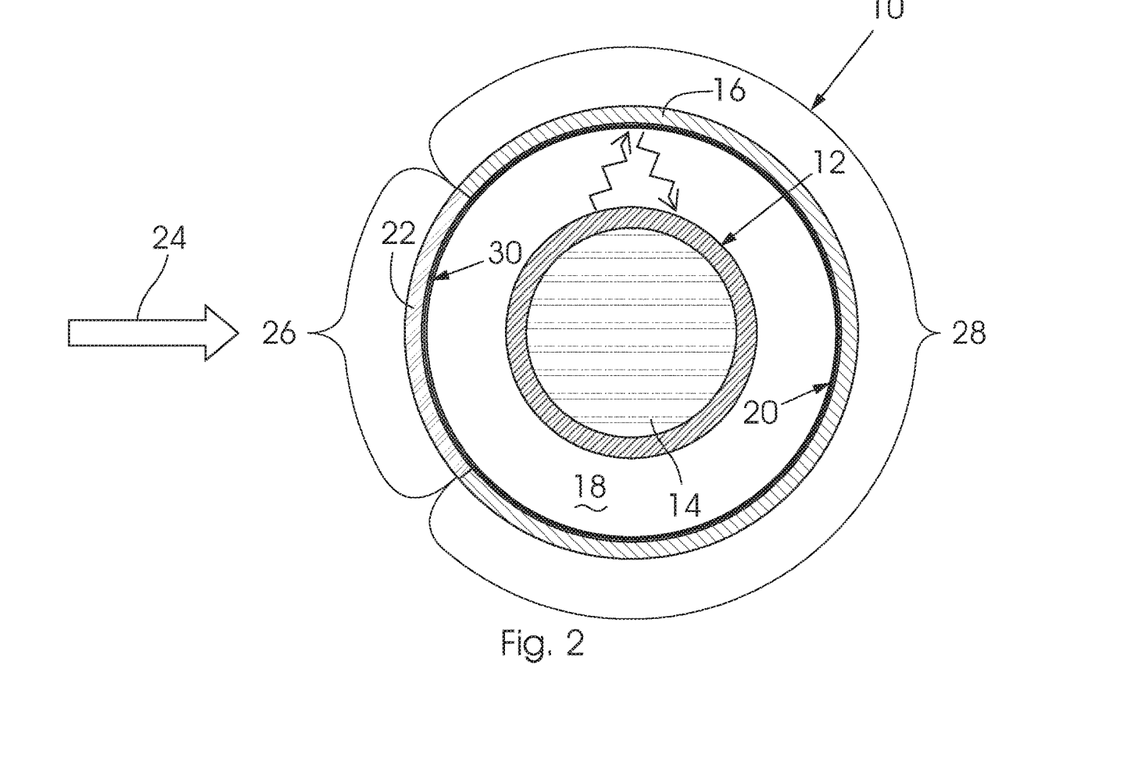
FIG. 2 shows a cross-sectional view of the receiver unit in accordance with the invention.

The construction of the receiver unit 10 is shown in greater detail in the cross-sectional view of FIG. 2. From this figure it can be seen that the receiver unit 10 includes a conduit 12 for conveying a heat transfer fluid 14.

In the preferred embodiment of the receiver unit 10 the conduit 12 is in the form of a pipe running along the length of the parabolic trough collector 100. The pipe 12 is designed to absorb solar or thermal radiation. It is envisaged that the pipe 12 could be a blackened pipe. As a result of its solar radiation absorbing characteristics the pipe 12 is also referred to as an absorber pipe.

As seen in FIG. 2, the pipe 12 runs along the longitudinal centreline of the receiver unit 10. A cover 16 is located about the pipe 12. In the illustrated embodiment of the receiver unit 10 the cover is in the form of a tubular cover.

Similarly to the pipe 12, the cover 16 runs along the longitudinal length of the parabolic trough collector 100. The pipe 12 and cover 16 are preferably arranged so that they are concentric.

The receiver unit 10 has a volumetric space or cavity 18 between the pipe 12 and cover 16. In order to minimise convective losses occurring in the receiver unit 10 and thereby to improve the efficiency of the parabolic trough collector 100, a vacuum is created in the cavity 18 between the pipe 12 and the cover 16.

Referring still to FIG. 2, it can be seen that at least a portion of the cover 16 carries a reflective surface 20 for reflecting solar or thermal radiation onto the absorbent pipe 12. In the preferred embodiment the reflective surface 20 is in the form of a highly reflective mirror surface typically in the infrared radiation (IR) range, such as an aluminium surface, for example. The mirror 20 is preferably carried by the internal surface of the cover 16. In this embodiment the mirror surface 20 is opaque in order to minimise solar radiation loss through the cover 16. Considering that the mirror surface 20 surrounds the cavity 18 it is also referred to as a cavity mirror 20. In the illustrated embodiment of the receiver unit 10 the cavity mirror 20 carries a highly reflective aluminium surface. It should however be understood that aluminium is only one example of a material that can be polished from inside to become a high reflective material and that other materials with similar properties can be used. The invention is therefore not limited to an aluminium surface.

The receiver unit 10 further has a window 22 through which incoming solar radiation passes, in use. As indicated by the arrow 24 in FIG. 2, the solar radiation passes through the window 22, into the vacuum 18 and onto the absorbent pipe 12. It should be understood that solar radiation only passes through the cover 16 in the region of the window 22. The mirror surface 20 applied to the internal surface area of the cover 16 outside the area of the window 22 obstructs solar radiation from passing through the cover 16. In other words, the cover 16 has a first portion 26 defining the window 22 through which solar radiation is allowed to pass and a second portion 28 through which solar radiation is obstructed or prevented to pass. The window 22 is located in the first portion 26 and the mirror surface 20 is applied to the cover 16 in the region of the second portion 28. It should be understood from FIG. 2 that the first and second portions are circumferential portions of the tubular cover 16 and run along the longitudinal length of the cover 16.

The size of the window 22, i.e. the circumferential or arch length of the window 22, may range between about 5.4 cm and about 18 cm (the design parameters of the parabolic trough can be found in table. 1).

In the preferred embodiment of the receiver unit 10 the window 22, i.e. the first portion 26 of the cover 16, carries a hot mirror coating 30 for reflecting thermal radiation back onto the pipe 12. In use, the hot mirror coating 30 allows transmission of solar (visible) radiation onto the absorber pipe 12 from the outside and reflects the thermal radiation (IR) emitted from the absorber pipe 12 back onto the pipe 12. In this particular application the hot mirror coating 30 allows solar radiation to enter the vacuum 18 through the window 22 but reflects the thermal radiation (IR) and prevents it from exiting the vacuum 18 through the window 22.

It should be understood that the use of a hot mirror coating on the window 22 is optional. Although the use of the hot mirror coating on the window 22 improves the efficiency of the receiver unit 10 it is believed that even without the coating on the window 22 the receiver unit 10 provides superior results compared to known receiver units as a result of the highly reflective surface 20 in the second region 28 of the cover 16.

It has been found that the design of the receiver unit 10, and in particular the design of the window 22, including the use of a hot mirror coating 30, significantly reduces thermal losses from the receiver unit 10. In turn, the reduction in thermal losses increases the efficiency of the receiver unit 10 and, accordingly, the parabolic trough collector 100.

Although the highly reflective mirror surface 20 has been described as a layer applied to the internal surface of the cover 16, it is envisaged that the mirror surface 20 could be integrally formed as part of the cover 16. For example, the second portion 28 of the cover 16 could be manufactured from the mirror surface material, e.g. aluminium in this particular embodiment. The first portion 26 could therefore be manufactured from glass, such as borosilicate glass, and the second portion 28 from a material other than glass, such as aluminium. In this embodiment in which the cover is made from a material other than glass the window 22 may be in the form of a glass window located in an opening in the wall of the cover. Alternatively, in the embodiment in which the reflective surface 20 is applied as a layer on the internal surface of the cover 16, the entire cover 16 could be manufactured from glass.

From the above description of the invention it should be understood that the hot mirror coating has two significant benefits in that it transmits the sun radiation, i.e. visible light, and reflects the thermal radiation, i.e. IR radiation. It is therefore preferred to apply a hot mirror coating only to the cavity window 22 while a high reflective material is used in the second region 28 of the cover, such as a polished aluminium surface or mounting a layer of a polished aluminium sheet inside on the surface 20.

It is believed that, in addition to the improved efficiency, the receiver or receiving unit 10 of the invention provides further advantages over the known receiving units. For example, the embodiment in which an all glass cover 16 is used avoids metal-glass interface problems and vacuum leakage for example. In general, the receiver unit 10 of the invention offers a cost effective solution that has excellent resistance to breaking and is easy to maintain.

It is envisaged that the reflective surface 20 could take the form of a mirror sheet that provides heat resistance and a protective layer against corrosion and the weather. It has been found that the reflective sheet currently being sold by ALANOD GmbH & Co. KG under the trade mark Miro-Sun® works effectively. The reflective surface 20 provided by the mirror sheet has a total light reflectivity of 95%.

Theoretical Analysis of the Receiver Unit of the Invention

The design of the receiver unit 10 of the invention was studied theoretically by using a simulation code. The simulation results suggest that the design of the receiver unit 10 may significantly exceed the heat transfer fluid 14 temperature ceiling compared to the known designs currently being used in the industry and, accordingly, may increase the efficiency of the overall solar collector system.

Theory and Simulation Study

Figure 3:
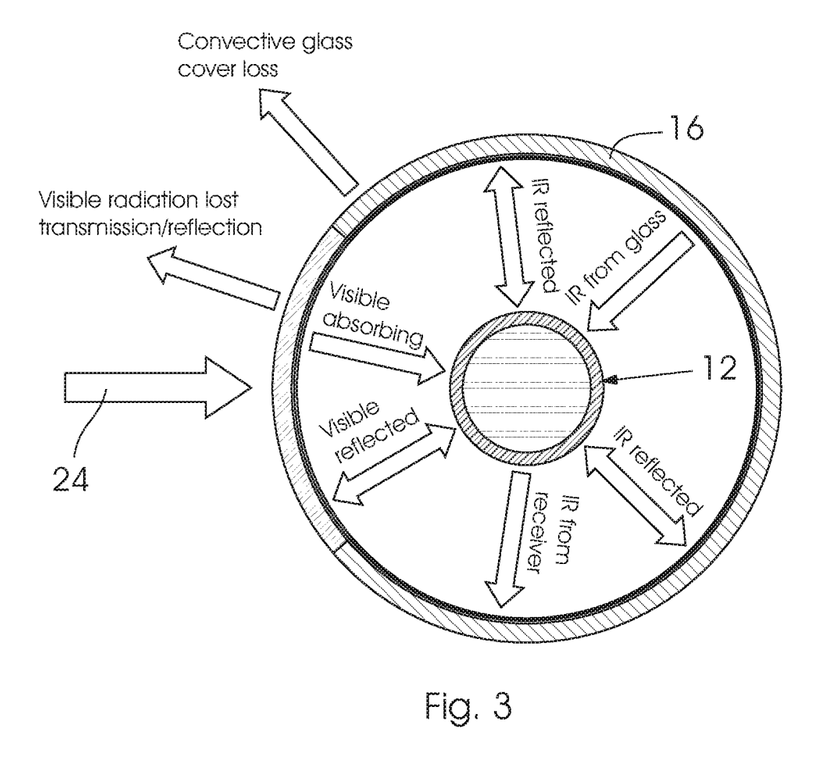
FIG. 3 shows a schematic representation of the possible heat transfer modes of the receiver unit of FIG. 2.

The total heat transfer of the system and the interaction between its components are reviewed briefly. The physical basis of the model used starts with a complete description of the thermal interaction, which is shown in FIG. 3, and then applying energy conservation principles for the thermal interactions between the components of the receiver unit 10.

The net heat flux due to solar radiation $q'_{Sol}$, convection $q'_{Conv}$, radiation $q'_{Rad}$, and conduction $q'_{Cond}$ are computed under steady state conditions using the energy balance relationship $$(\Sigma q'_{Sol} + \Sigma q'_{Conv} + \Sigma q'_{Cond} + \Sigma q'_{Rad})_{ij} = 0 \qquad (1)$$

The absorber pipe 12, the glass cover 16, and the heat transfer fluid 14 are discretized into control volumes (CV), using a finite volume method (FVM). The absorber pipe 12 and glass cover 16 are discretized along azimuthal and longitudinal directions, but the heat transfer fluid 14 is only discretized along the longitudinal direction. Equation (1) holds for every control volume (CV).

Results

The theoretical model of the receiver unit 10, taking hot mirror 20 interactions into account, has been derived in Kaluba V S and Ferrer P; 2016; *A model for hot mirror coating on solar parabolic trough receivers J. Renew*; Sustain. Energy; 8, 053703 [1]. In this instance the simulation code presented in [1] is edited in order to fulfil the cavity requirements.

A simulation validation was undertaken using two approaches. Firstly, simulation parameters for physical scenarios where the outcomes could be derived by other means were selected. The zero irradiation case, zero conductivity in the materials, zero heat transfer fluid convective coefficient, and zero emissivity on the absorber surface were selected. The results conformed to theoretical expectations. Secondly, upon comparing the simulation results with existing experimental data for a selective coating, it was found that the comparison was encouragingly close (less than 0.7% discrepancy). The operating conditions and design parameters that were used simulate the SEGS LS2 (Hachicha A A, Rodríguez I, Capdevila R and Oliva A; 2013; *Heat transfer analysis and numerical simulation of a parabolic trough solar collector Appl. Energy*; 111, 581-92). They are shown in Table 1 below.

Table 1

| Design parameters of the receiver unit used in the simulation [2]. | |
|---|---|
| Parameter | Value |
| Collector aperture (W) | 5 m |
| Focal distance (f) | 1.84 m |
| Absorber internal diameter | 0.066 m |
| Absorber external diameter | 0.07 m |
| Absorber emissivity (IR) | 0.15 |
| Glass internal diameter | 0.109 m |
| Glass external diameter | 0.115 m |
| Glass emissivity (IR) | 0.86 |
| Receiver absorptance (visible) | 0.96 |
| Glass transmittance (visible) | 0.93 |
| Parabola specular reflectance | 0.93 |
| Incident angle | 0.0 |
| Solar irradiance | 933.7 W/m$^2$ |
| HTF | Molten salt |
| Mass flow rate* | 0.34 Kg/sec |
| Temperature HTF (inlet) | 375.35 K |
| Temperature ambient | 294.35 K |
| Wind speed | 2.6 m/s |
| Reflectivity of the cavity mirror* | 0.95 |
| Hot mirror reflectivity (IR)* | 0.85 |
| Hot mirror transmittance (visible)* | 0.875 |

*stands for the cavity design requirements.

Effect of the Window Size on the Temperature and the System Efficiency

Figure 4:
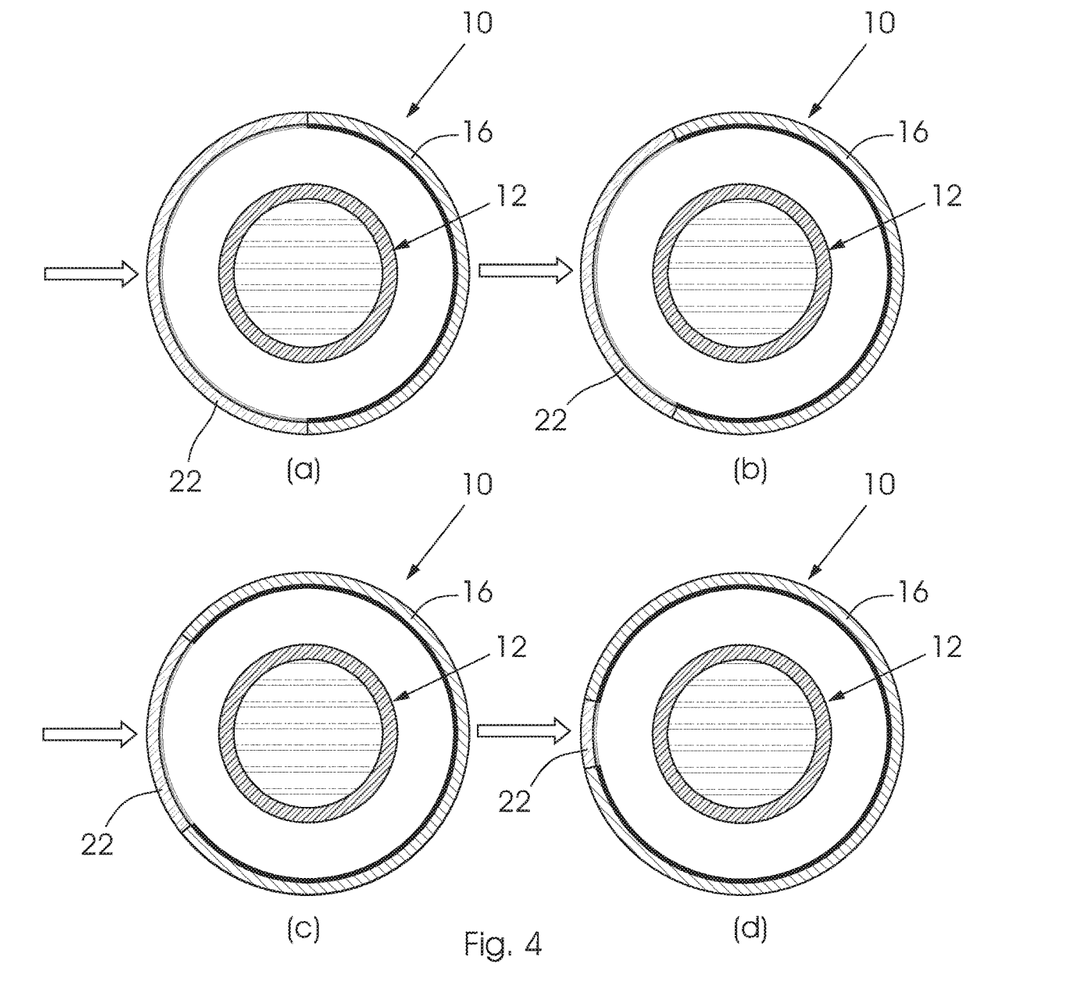
FIG. 4 shows different window sizes of the receiver unit of FIG. 2.

The window 22 is the only radiation entrance window of the receiver unit 10, at which the concentrated solar radiation can enter and get absorbed by the absorber pipe 12. In order to design this system and optimise efficiency, the effect of the window size on the efficiency and heat transfer fluid 14 temperature were investigated. Four different window sizes (arc lengths) were used, namely 18 cm, 12.6 cm, 9 cm, 5.4 cm, which are equivalent to the length of 50 CVs, 35 CVs, 25 CVs, and 15 CVs respectively as illustrated in FIG. 4 (*a*) to (*d*) respectively.

Figure 5:
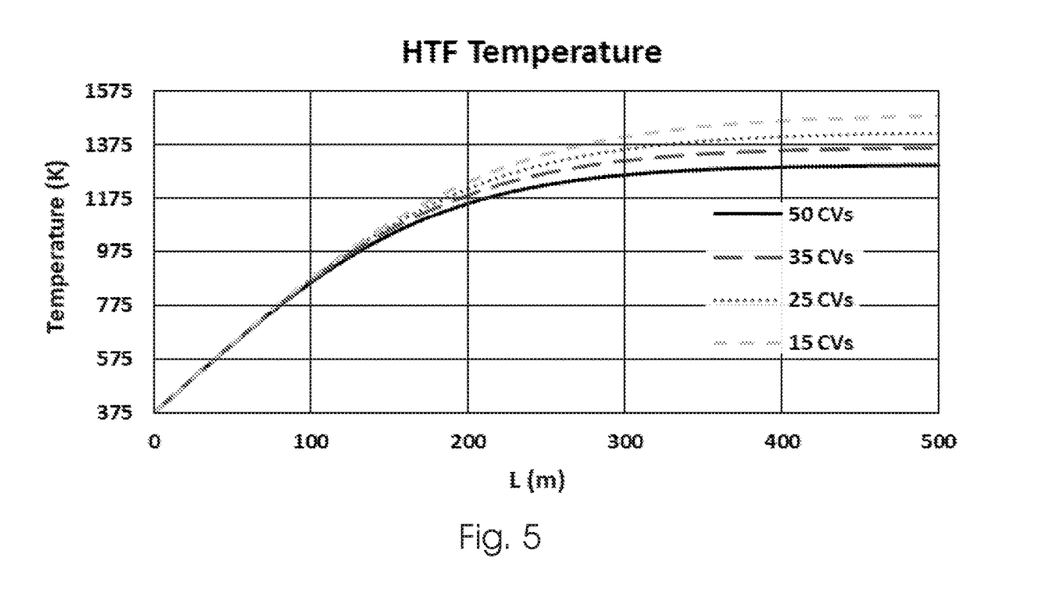
FIG. 5 shows a graph obtained from a simulation indicating the heat transfer fluid temperature as a function of the length of the receiver unit with different window sizes.

In the graph of FIG. 5, the axial temperature variation for the heat transfer fluid 14 along the length of the receiver unit 10 is displayed for heat transfer fluid inlet temperatures of 375K. It can be seen that the temperature increases roughly linearly and then flattens out to approach the stagnation temperature (where solar energy input equals thermal emission losses). This shows that the smaller the window size, the higher the temperature that can be achieved. The maximum heat transfer fluid 14 temperature for the receiver unit 10 rises close to 1300 K at 50 CVs and 1490 K at 15 CVs.

Figure 6:
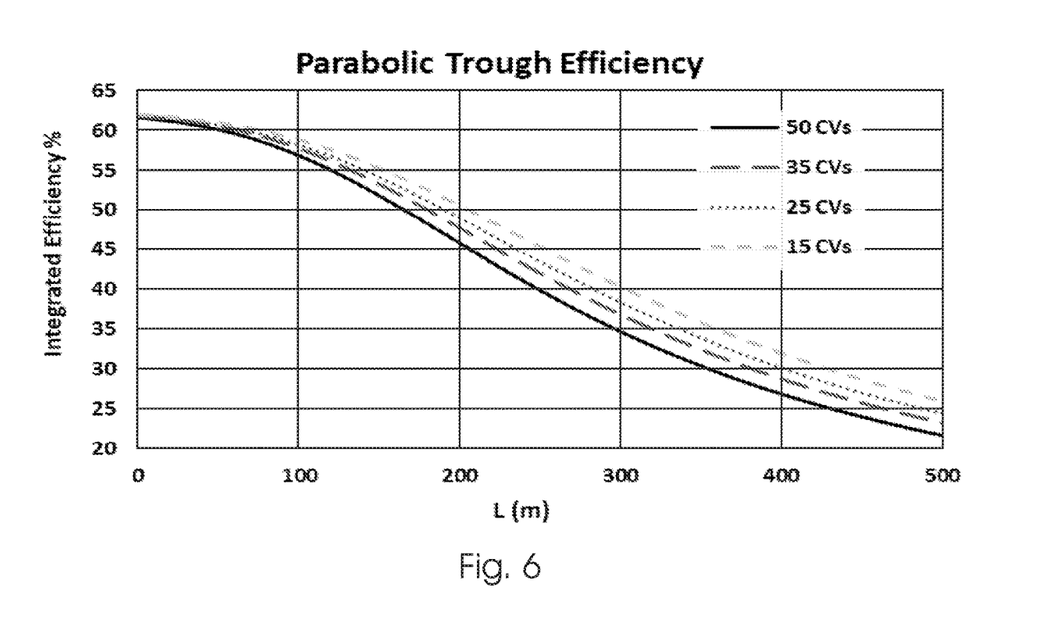
FIG. 6 shows a graph obtained from a simulation indicating the integrated efficiency of the parabolic trough collector using the receiver unit in accordance with the invention.

The graph of FIG. 6 illustrates the integrated efficiency which is the ratio between the solar irradiation incident on the receiver unit 10 via the parabolic mirror of the collector 100 and the rate of the heat transfer into the heat transfer fluid 14. The graph refers to the percentage of the energy in the form of the concentrated solar radiation that can be converted into thermal energy via the parabolic trough collector 100. From this figure it can be seen that the efficiency of the parabolic trough collector 100 using the receiver unit 10 changes with different window 22 sizes. It has been found that the smaller window 22 sizes reaches higher efficiency than the larger window sizes.

The Effect of the Cavity Mirror Reflectivity on the Heat Transfer Fluid Temperature and the System Efficiency An underlying principle of the cavity design of the receiver unit 10 is to trap the thermal emission radiation by reflecting the thermal radiation back onto the absorber pipe 12 much more effectively than known receiver units. This means that the reflectivity of the cavity mirror 20 is a significant parameter in the design, and it is therefore important to study how the reflectivity affects the system efficiency and heat transfer fluid 14 temperature. This was investigated by simulating the design of the receiver unit 10 with three different values of the cavity mirror 20 reflectivity, namely 92%, 95%, and 98% using a window size of 5.4 cm (15 CVs).

Figure 7:
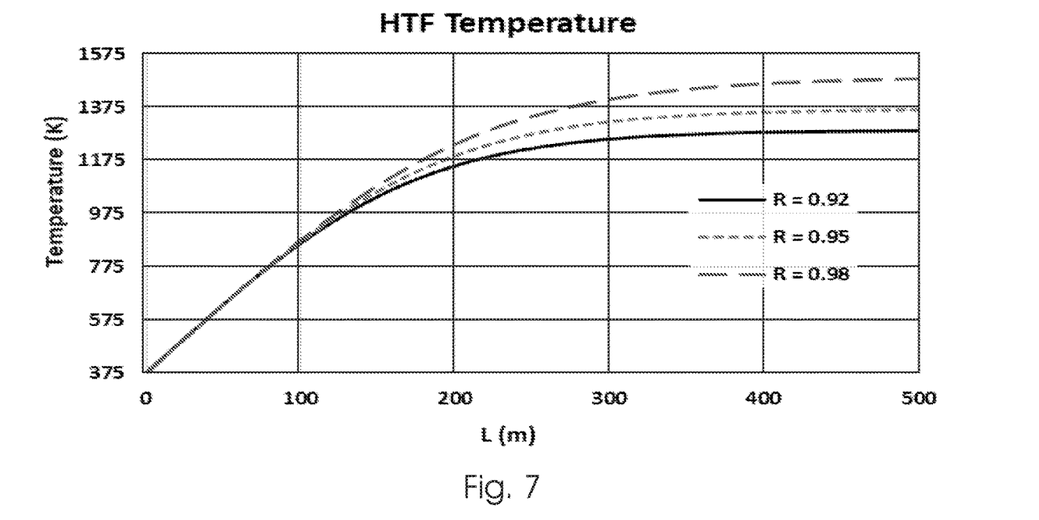
FIG. 7 shows a graph obtained from a simulation indicating the heat transfer fluid as a function of the length of the receiver unit in accordance with the invention with different cavity mirror reflectivity.

It can be seen that the behaviour plotted in the graph of FIG. 7 is similar to that of FIG. 5 but the effect of the reflectivity (R) of the cavity mirror 20 is significantly higher than the effect of different window sizes along the receiver unit length. The maximum heat transfer fluid 14 temperature for the design of the receiver unit 10 reaches approximately 1290 K at R=92%, approximately 1370 K at R=95%, and approximately 1490 K at R=98%.

Figure 8:
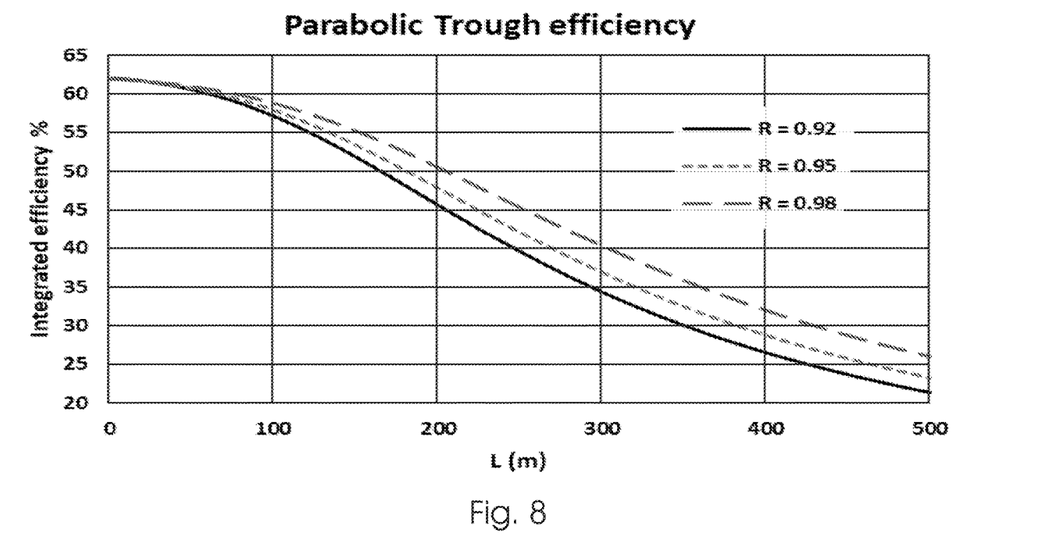
FIG. 8 shows a graph obtained from a simulation indicating the integrated efficiency of the parabolic trough collector using a receiver unit in accordance with the invention with different cavity mirror reflectivity.

As shown in FIG. 8, the reflectivity of the cavity mirror 20 has strong impact on the efficiency of the parabolic trough collector 100.

The Effect of the Hot Mirror Coating Over the Window

As mentioned above, the window 22 is the only place the wall of the cover 16 where large amounts of thermal radiation can escape the cavity 18. In accordance with the present invention this loss is reduced by coating the inside of the glass cover 16 over the window 22 with a hot mirror coating 30. An added effect of the hot mirror coating 30 is that the glass cover 16 temperature is reduced, thereby minimising thermal stresses. In order to evaluate the importance of applying the hot mirror coating 30 over the window 22, the system is simulated with (W) and without (WO) the hot mirror coating 30 over the window 22 at a cavity mirror reflectivity of R=98% and using a window size of 5.4 cm.

Figure 9:
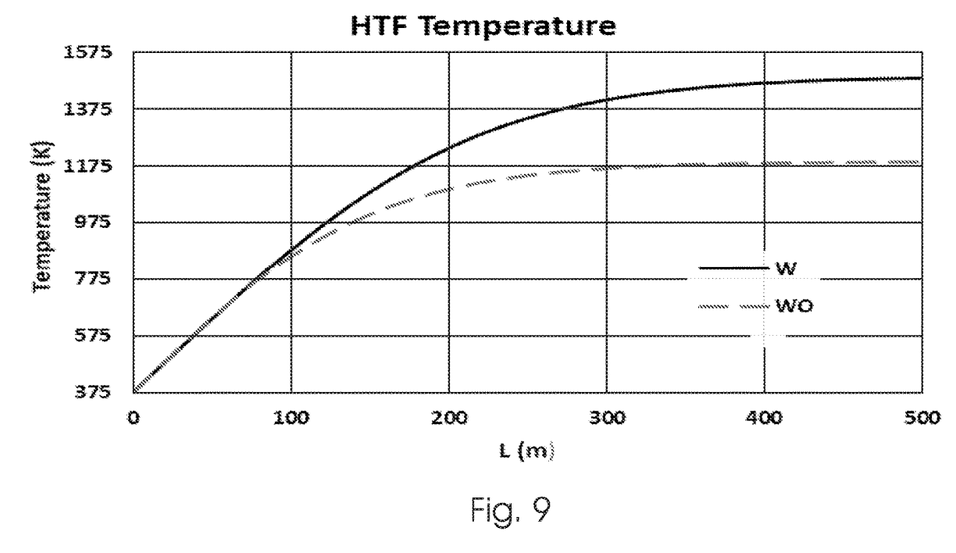
FIG. 9 shows a graph obtained from a simulation indicating the heat transfer fluid as a function of the length of the receiver unit in accordance with the invention with and without a hot mirror coating over the window.
Figure 10:
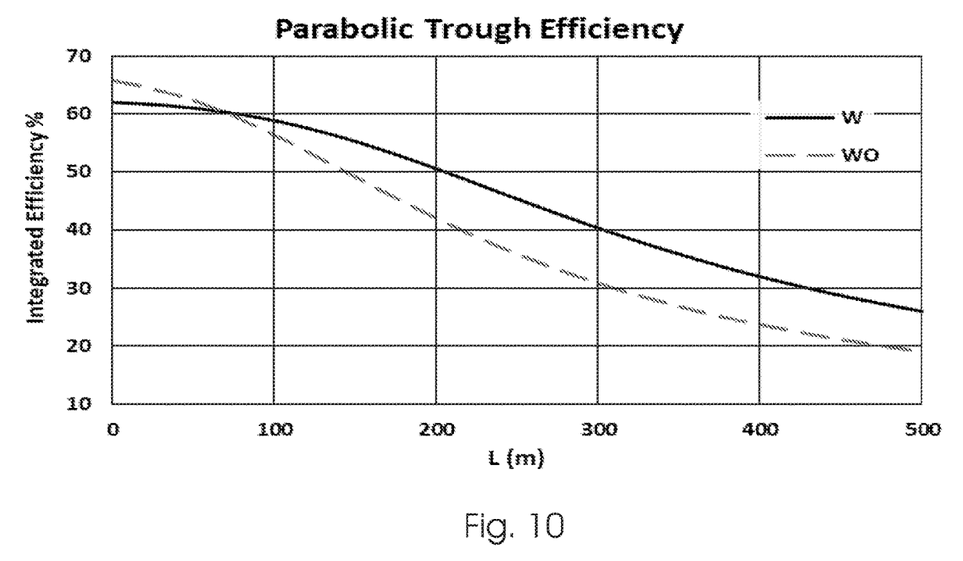
FIG. 10 shows a graph obtained from a simulation indicating the efficiency of the parabolic trough collector using the receiver unit in accordance with the invention with and without a hot mirror coating over the window.

The results shown in FIG. 9 show that the hot mirror coating 30 over the window 22 has strong influence on the heat transfer fluid 14 temperature at higher temperatures. A maximum temperature of about 1190 K was reached using a window 22 without a hot mirror coating 30 whereas a maximum temperature of about 1490 K was reached using a window 22 covered by a hot mirror coating 30. Considering the effect of the hot mirror coating 30 on the efficiency of the system, the results of FIG. 10 show that the hot mirror coating 30 over the window 22 works efficiently, especially at higher temperatures compared to the window without the hot mirror coating. In the region where the receiver unit 10 length is less than 40 m, the efficiency of the system without a hot mirror coating is higher than the system with a hot mirror coating 30. This is due to the hot mirror coating 30 reflecting a small portion of the solar spectrum and, accordingly, less solar radiation is incident on the absorber pipe 12. At higher temperatures, this negative effect is compensated by the reduced heat losses due to the hot mirror coating 30.

Other Benefits of the Hot Mirror Coating

The window 22 is exposed to thermal stress at higher temperatures and the hot mirror coating 30 over the window 22 is a way to reduce this thermal stress by reflecting thermal radiation back onto the absorbent pipe 12. In order to investigate the temperature distribution around the circumference of the cover 16, including the window 22, and analyse how the hot mirror coating 30 behaves at higher temperatures, the temperature distribution around the circumference of the cavity 18 (i.e. the circumference of the cover 16 including the window 22) at different lengths of the receiver unit 10 was simulated.

Figure 11:
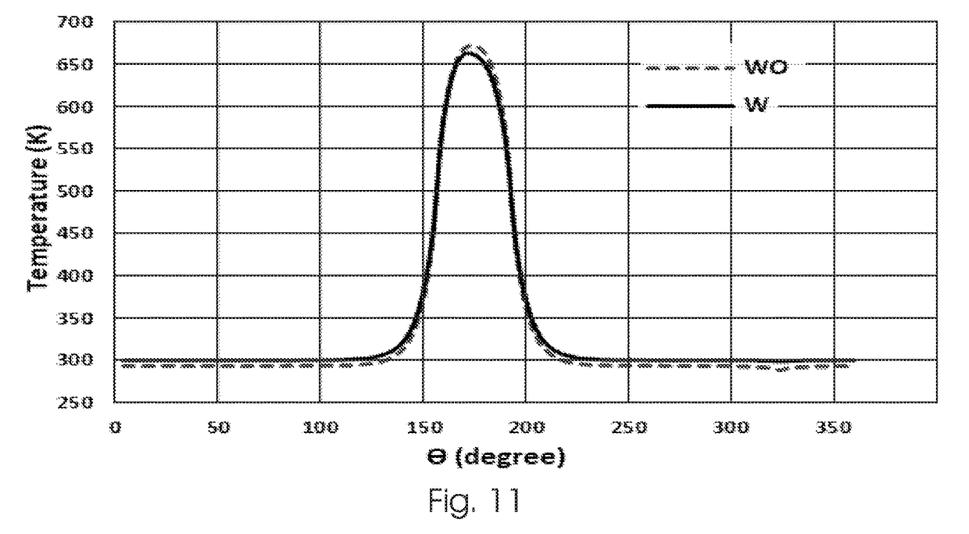
FIG. 11 shows a graph obtained from a simulation indicating the surface temperature of the outer surface of the receiver unit in accordance with the invention at a length 100 m with and without a hot mirror coating over the window.
Figure 12:
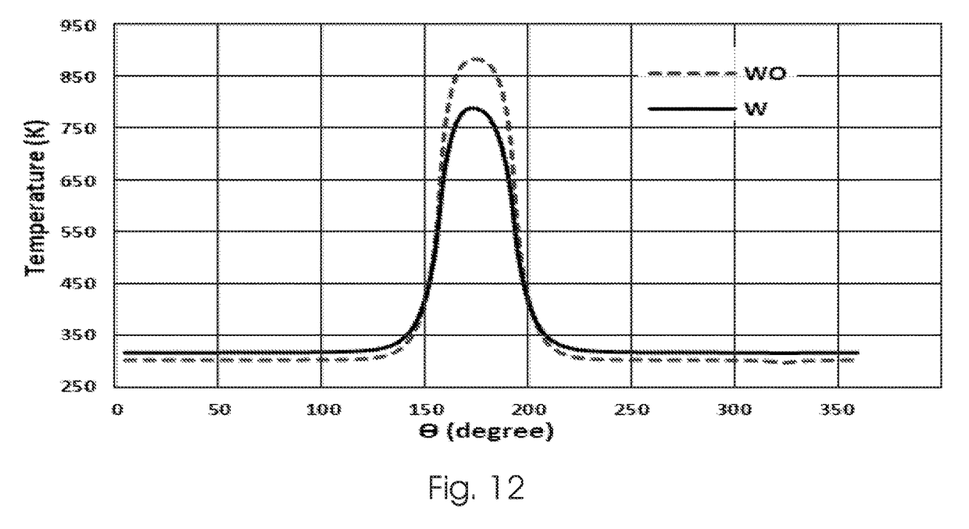
FIG. 12 shows a graph obtained from a simulation indicating the surface temperature of the outer surface of the receiver unit in accordance with the invention at a length 200 m with and without a hot mirror coating over the window.

FIGS. 11 and 12 show the temperature profile around the outer surface of the cavity 18 circumference with (W) and without (WO) hot mirror coating 30 over the window 22. The angle 180° points directly away from the sun (and towards the centre of the parabolic mirror 102). The temperatures at the window 22 varies by approximately 15 degrees and 100 degrees at the length of the receiver unit 10 at 100 m and 200 m respectively. Accordingly, most thermal losses will occur from the radiation entrance window 22, i.e. the first portion 26. The hot mirror coating 30 over the window 22 helps in decreasing the thermal losses compared to the window without the hot mirror coating. At the remaining circumference, i.e. in the second portion 28, the temperature difference is relatively small.

Comparison Between the Receiver Unit of the Invention and Known Receiver Units Comprising a Selective Coating and No Coating The received unit 10 of the invention is evaluated by comparing its performance to known receiver units which include either a selective coating on the absorbent pipe 12 or no coating on the pipe at all, i.e. a bare receiver unit. The receiver units with no coating and a selective coating were also simulated.

Figure 13:
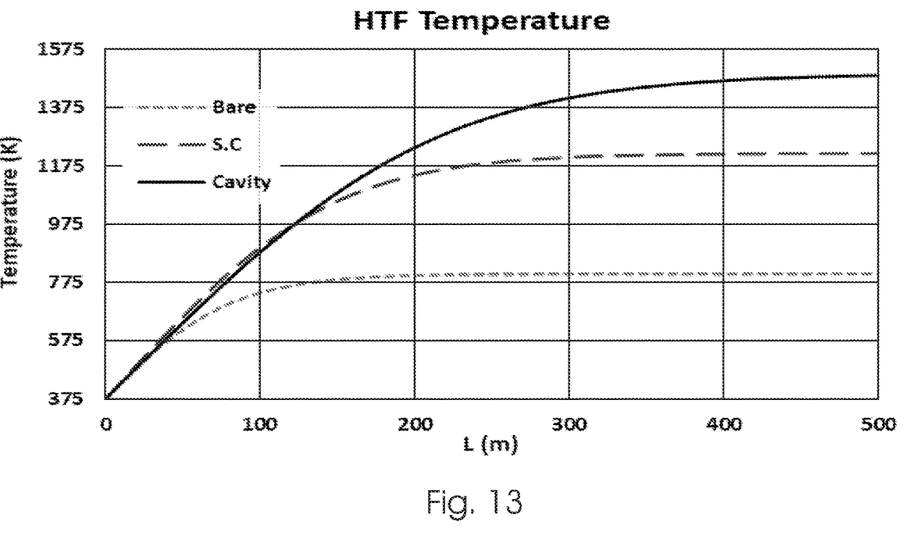
FIG. 13 shows a graph obtained from a simulation indicating a comparison in the heat transfer fluid outlet temperature for 375K inlet temperature of the receiver unit in accordance with the invention in comparison to the known designs.
Figure 14:
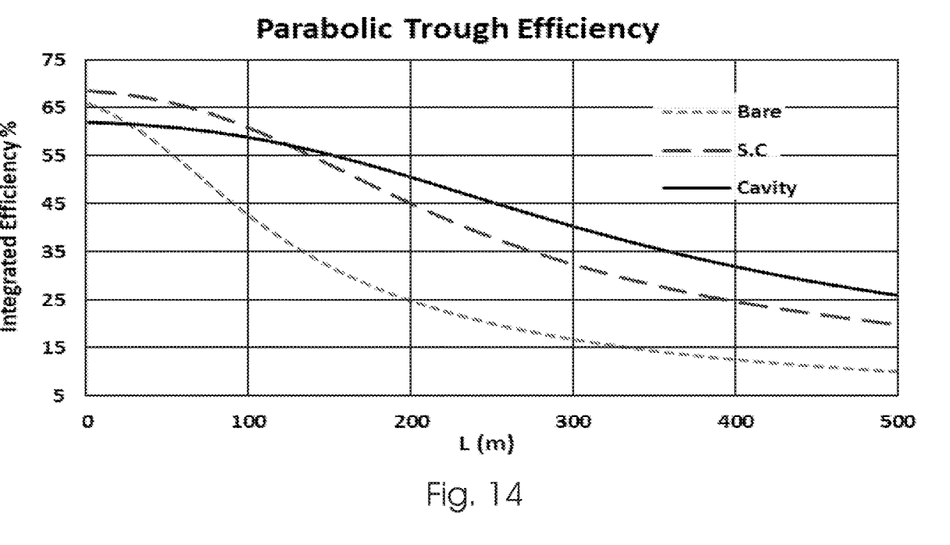
FIG. 14 shows a graph obtained from a simulation indicating a comparison in the efficiency of the parabolic trough collector using a receiver unit in accordance with the invention in comparison to the known designs.

The results of FIG. 13 show the heat transfer fluid 14 temperature along the length of the receiver unit 10. It should be noted that the selective coating material on the absorbent pipe 12 will be chemically decomposed around 680K, as previously mentioned, and its length will be limited to <100 m. The receiver unit 10 of the invention therefore has the capability of exceeding the selective coating temperature ceiling. The results illustrated in FIG. 14 clearly show that the parabolic trough collector 100 using a receiver unit 10 in accordance with the invention has a superior efficiency in comparison to collectors using the known receiver units.

Conclusion

The receiver unit 10 performs very well at higher temperatures and it is theoretically capable of exceeding 1400K, thus outperforming current technologies due to its thermal stability. This, in turn, can increase the overall (Rankine) efficiency of the entire solar collector plant. Other important parameters that affect the temperature profile and the efficiency include the window 22 size and the reflectivity of the cavity mirror 20. The heat transfer fluid 14 temperature and the efficiency increase with the smaller window 22 sizes.

The reflectivity of the cavity mirror 20 has a significant effect on both temperature and the efficiency. The presence of the hot mirror coating 30 over the window 22 has an important role in reducing the thermal stress at a higher temperature and decreasing the thermal radiation loss in this region, i.e. the first portion 26. This, in turn, helps to increase the efficiency of the receiver unit 10 and therefore the solar collector 100.

Description of Experimental Setup and Testing

Figure 15:
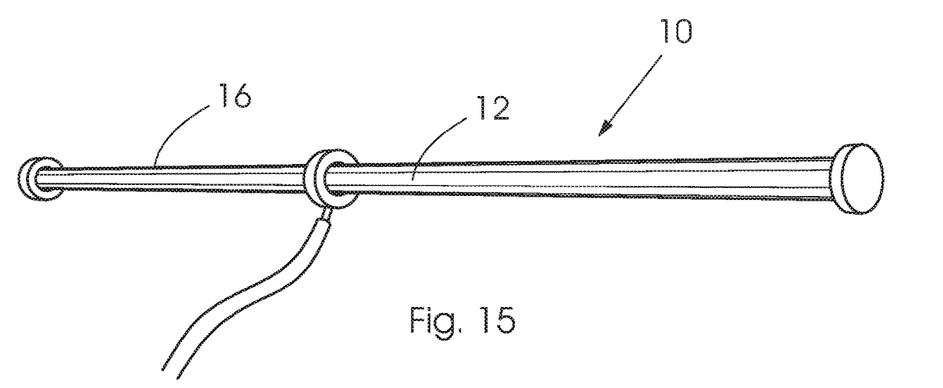
FIG. 15 shows an illustration of the experimental setup used in testing the receiver unit of the invention.

The receiver unit 10 was tested using the experimental setup shown in FIG. 15. The length of the tested receiver unit 10 was about 2.7 m at 25° C. (but it will expand by about 9 mm at 300° C.). The receiver unit 10 comprised a mild steel absorber pipe 12, which has an outer diameter of about 32 mm and in inner diameter of about 28 mm, and a two-piece cover 16 made from Pyrex glass, which has an outer diameter of about 58 mm and an inner diameter of about 54 mm. The glass cover sections had a length of 1.35 m each to make up the combined total length of 2.7 m. The glass cover pieces were joined together with a brass section in the centre of the absorber pipe 12. The central brass piece, glass cover pieces and the absorber pipe were vacuum sealed together using flame resistant high temperature silicon. The high temperature silicon also acted as a thermal insulator between the joints in this experiment.

Two heating elements 32 inside the absorber pipe of the receiver unit brought the HTF temperature to the desired test temperature. The absorber pipe itself was filled with sand mimicking the HTF. The heating element power was adjusted using a Variac. The heating elements 32 were both about 1.2 m in length, had an outer diameter of about 8 mm, and were joined electrically inside the absorber pipe 12. In order to prevent the heating elements 32 from touching the absorber pipe 12, spacers 34 were used to centre the heating elements. These spacers 34 were be made from steel and had a small size and sharp edge toward the absorber pipe inner surface to minimize heat conduction losses through them.

Once the receiver unit 10 reached a steady state temperature, the electrical power required to maintain the HTF temperature equalled the heat loss of the receiver unit at that temperature.

Further, the temperatures along the receiver unit 10 were approximately constant (to within a few degrees). The heat loss of the receiver unit 10 was tested at different temperatures corresponding to heating power generation of the heating elements 32 from 50 W to 2 kW in roughly 50 W increments. Heat losses were reported as Power density (Watts per meter) of the receiver unit 10.

Four thermocouples 36.1 to 36.4 were used to determine the average temperatures and heating behaviour of the receiver unit 10, by measuring the temperature of the outer surface of the absorber pipe 12 and glass cover 16 at two points along the length of the receiver unit. The absorber pipe 12 and glass cover 16 temperatures were measured using two and four K-type thermocouples respectively. A good contact between the thermocouples 36.1 to 36.4 and the surface was provided to ensure accurate measurements. From the temperature information, the heat loss to the environment could be determined.

Figure 16:
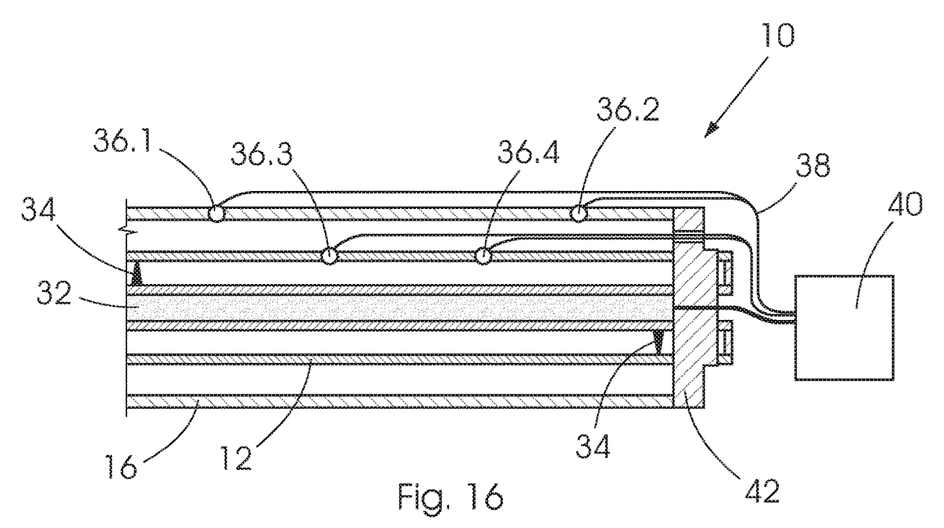
FIG. 16 shows a schematic illustration of the rights hand side of the experimental setup used in testing the receiver unit of the invention.

Referring to FIG. 16, the thermocouple wires 38 were insulated with a thermally resistance braided tube and grouped together at the end. Their ends are connected to a control and measurement unit 40. Furthermore, two holes through the end piece 42 are made to allow the absorber pipe thermocouple wires to connect to the control and measurement unit via vacuum tight exits. The control and measurement unit 40 allowed for the regulation and adjustment of the heater power in accordance to temperature requirements.

Numerical Model and the Algorithm Description

Figure 17:
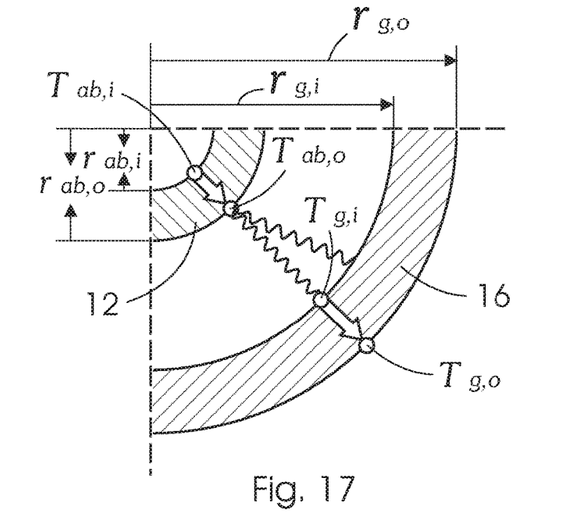
FIG. 17 shows an illustration of a partial cross-section of the receiver unit of the invention used during testing.

The source of the thermal energy is an electrical resistance heater wire 32 with a constant rate of heat generation and can be modified by a Variac. FIG. 17 shows the total heat transfer of the system and the interactions between its components. The theoretical and the numerical model with a comprehensive description of the thermal interaction is the same as that discussed above in the case of applying non-uniform solar flux, except for the following differences: the origin of the heat flux is coming from the absorber pipe outer surface because the uniform heating element 32 is attached to the absorber pipe 12 from inside. This means that there is no reason to consider the HTF in the calculations, so that the convection heat transfer term (Q̇AF) is removed from the energy balance equations across the absorber pipe control volume (APCV). In addition, the interception of solar radiation on APCV (Q̇AP) becomes the heat generating power of the heating element 32 on the APCV and there is no interception of solar radiation on cavity CV (Q̇HM,ol). Therefore, under steady operating conditions, the absorber pipe 12 and the outer glass cover 16 reach different stagnation temperatures, but they are isothermal. In addition, the heat loss and the heat gain of each element in the receiver unit 10 must equal the total rate of heat generation of the heating elements 32 Ėgen $$\dot{q}HM,amb = \dot{q}HM,cond = \dot{q}AP,HM = \dot{q}HM,AP = \dot{E}gen,$$

where q̇HM,amb is the rate of the heat transfer from the glass cover 16 to the surroundings, q̇HM,cond is the conduction through the glass cover 16 layer, q̇AP,HM is the heat transfer from the absorber pipe 12 to the glass cover 16.

The calculations start from the heat loss to the ambient because the ambient temperature is always known. The unknown outer glass cover 16 surface temperature Tg, was initially guessed iteratively, until the steady operating condition at which q̇HM, =Ėgen is fulfilled. The heat rate q̇HM, consists of natural convection and radiation heat transfer from the glass cover 16 to the ambient as discussed in the theoretical analysis above. The air properties during the calculation were selected at $$Tavg = \frac{Tg, o + Tamb}{2}.$$

Tg, at which the rate of heat loss due to the conduction through the glass cover 16 equal Ėgen could then be calculated. In the same way, Tab, is evaluated through iteration until fulfilling q̇AP, =Ėgen, where q̇AP,M consists of the rate of the heat transfer between the absorber pipe 12 and the glass cover 16 by convection and radiation. The convection heat transfer inside the evacuated annulus was ignored.

Results

Figure 18:
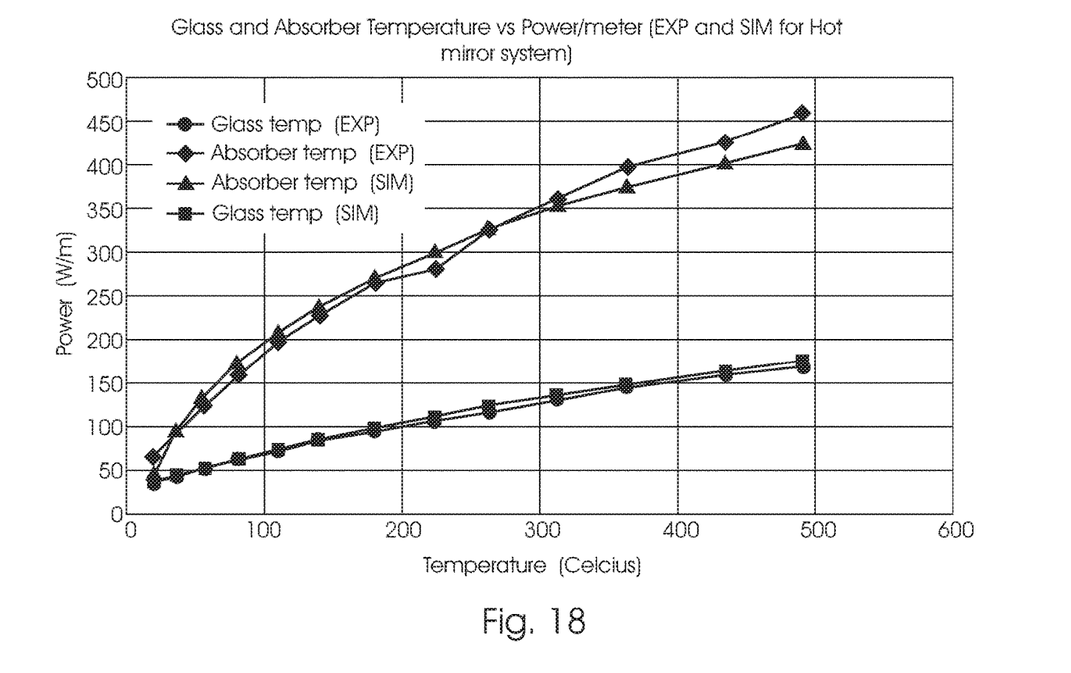
FIG. 18 shows a graph indicating the results of the experimental testing in which the power density is plotted against the measured and simulated temperature.

The results of the experiment and the simulation are shown in FIG. 18. The power density is displayed on the vertical axis, in units of watts per meter, and the measured and simulated temperatures are displayed on the horizontal axis, in units of degrees Celsius. Both the experimental results (EXP) and the results from the simulation (SIM) are shown. It is seen that the experimental and simulated results for the glass cover 16 diverge at most by less than 3%, while those of the absorber pipe 12 by at most 6% at around 500° C., where the simulation underestimates the temperature.

Conclusion

The results from the experimental setup and test suggest that there is strong support for the results obtained from the simulation. Accordingly, there is strong evidence supporting the advantages of the receiver unit 10 of the present invention over known receiver units as set out above. In particular, the experimental results supports the simulated results showing that the receiver unit 10 of the present invention achieves a higher efficiency than the efficiency achieved using known receiver units. Accordingly, the receiver unit 10 of the invention allows for greater efficiency of the solar collector 100.

It will be appreciated that the above description of the illustrated embodiments, the embodiments used in the theoretical analysis and the embodiments used in the experimental test only provides some embodiments of the invention and that there may be many variations without departing from the spirit and/or scope of the invention. It is easily understood from the present application that the particular features of the present invention, as generally described and illustrated in the figures, can be arranged and designed according to a wide variety of different configurations. In this way, the description of the present invention and the related figures are not provided to limit the scope of the invention but simply represent selected embodiments.

The skilled person will understand that the technical characteristics of a given embodiment can in fact be combined with characteristics of another embodiment, unless otherwise expressed or it is evident that these characteristics are incompatible. Also, the technical characteristics described in a given embodiment can be isolated from the other characteristics of this embodiment unless otherwise expressed.

The invention claimed is:

1. A receiver unit for a parabolic trough solar plant, the receiver unit including:
   a conduit for conveying a heat transfer fluid, wherein the conduit is capable of absorbing thermal radiation; and
   a cover, which is located about the conduit such that a vacuum is formed between the conduit and the cover;
   wherein the cover has a first region, defining a window through which incoming solar radiation passes into the vacuum and onto the conduit, and a second portion carrying a reflective surface so as to reflect thermal radiation back onto the conduit;
   wherein the window in the first region of the cover is in the form of an opening in the cover in which a glass window, to which a hot mirror coating for reflecting thermal radiation back onto the conduit is carried;
   wherein the cover is in the form of a metal tube such that the reflective surface in the second portion is defined by the internal surface of the metal tube; and
   wherein the ratio of the window size to the cover outer circumference is between 0.15 and 0.5, the reflectivity of the reflective surface is between 92% and 98% and a heat transfer fluid temperature ceiling is between 1300K and 1490K.

2. The receiver unit according to claim 1, wherein the hot mirror coating is applied an internal surface of the window.

3. The receiver unit according to claim 1, wherein the cover is in the form of an aluminum tube.

4. A method of reducing thermal radiation loss from a parabolic trough receiver having a conduit for conveying a heat transfer fluid, wherein the conduit is capable of absorbing thermal radiation, and a metal tube cover, which is located about the conduit such that a vacuum is formed between the conduit and the cover, the method including:

allowing incoming solar radiation to pass through a glass window carried in an opening in the cover that has a window size of between 0.15 and 0.5 in ratio relative to the outer circumference of the cover, into the vacuum and onto the conduit;

reflecting thermal radiation back onto the conduit by means of a reflective surface defined by an internal surface in a second portion of the cover having a reflectivity of between 92% and 98%;

applying a hot mirror coating to the window to reflect thermal radiation back onto the conduit; and heating the heat transfer fluid to a temperature up to between 1300K and 1490K.

\* \* \* \* \*